(12) United States Patent
Patton et al.

(10) Patent No.: US 6,396,599 B1
(45) Date of Patent: May 28, 2002

(54) METHOD AND APPARATUS FOR MODIFYING A PORTION OF AN IMAGE IN ACCORDANCE WITH COLORIMETRIC PARAMETERS

(75) Inventors: David L. Patton, Webster; John R. Fredlund, Rochester; John D. Buhr, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/216,900

(22) Filed: Dec. 21, 1998

(51) Int. Cl.[7] ............................................. G06K 15/00
(52) U.S. Cl. ...................... 359/1.9; 358/518; 382/164
(58) Field of Search ................................. 382/164, 118, 382/190; 358/1.9, 500, 518, 530

(56) References Cited

U.S. PATENT DOCUMENTS

| | | | | |
|---|---|---|---|---|
| 3,739,078 A | * | 6/1973 | Pugsley et al. .......... 178/5.2 A |
| 4,805,223 A | * | 2/1989 | Denyer ........................... 382/4 |
| 4,847,677 A | * | 7/1989 | Music et al. .................. 358/13 |
| 5,027,420 A | | 6/1991 | Takebayshi et al. .......... 382/38 |
| 5,029,312 A | | 7/1991 | Goenner ....................... 355/38 |
| 5,212,518 A | | 5/1993 | Numakura et al. ........... 355/77 |
| 5,225,900 A | | 7/1993 | Wright ......................... 358/95 |
| 5,296,884 A | | 3/1994 | Honda et al. ............... 354/106 |
| 5,296,945 A | | 3/1994 | Nishikawa et al. ......... 358/518 |
| 5,300,974 A | | 4/1994 | Stephenson, III ............ 354/75 |
| 5,390,381 A | | 2/1995 | LaMantia ...................... 5/417 |
| 5,444,487 A | * | 8/1995 | Kondo ........................ 348/405 |
| 5,447,811 A | | 9/1995 | Buhr et al. .................... 430/20 |
| 5,478,238 A | * | 12/1995 | Gourtou et al. ............ 434/100 |
| 5,488,429 A | | 1/1996 | Kojima et al. .............. 348/653 |
| 5,528,339 A | | 6/1996 | Buhr et al. .................... 355/32 |
| 5,638,136 A | | 6/1997 | Kojima et al. .............. 348/652 |
| 5,710,654 A | | 1/1998 | Inoue ......................... 396/374 |
| 5,715,377 A | | 2/1998 | Fukushima et al. ......... 355/518 |
| 5,726,737 A | | 3/1998 | Fredlund et al. .............. 355/40 |
| 5,797,750 A | * | 8/1998 | Gouriou et al. ............ 434/100 |
| 5,815,244 A | | 9/1998 | Tokuda ........................ 355/41 |
| 6,207,874 B1 | * | 3/2001 | Felton ......................... 602/42 |
| 6,208,749 B1 | * | 3/2001 | Gutkowicz-Krusin et al. ... 382/128 |
| 6,215,893 B1 | * | 4/2001 | Leshem et al. ............. 382/128 |
| 6,272,239 B1 | * | 8/2001 | Colla et al. ................. 382/167 |
| 6,278,533 B1 | * | 8/2001 | Takemoto .................... 358/521 |
| 6,293,284 B1 | * | 9/2001 | Rigg .......................... 132/200 |

FOREIGN PATENT DOCUMENTS

| EP | 0812116 A2 | * 12/1997 | ............. H04N/9/64 |
|---|---|---|---|
| JP | 02000113185 A | * 4/2000 | ............. G06T/5/00 |

* cited by examiner

Primary Examiner—Jerome Grant, II
(74) Attorney, Agent, or Firm—Frank Pincelli

(57) ABSTRACT

A method and apparatus for modifying images. The method includes the steps of analyzing a digital image file of an image so as to identify at least one predetermined colorimetric parameter; and automatically modifying that portion of said image having said at least one predetermined colorimetric parameter to a second predetermined colormetric parameter so as to produce a modified digital image.

19 Claims, 2 Drawing Sheets

METHOD AND APPARATUS FOR MODIFYING A PORTION OF AN IMAGE IN ACCORDANCE WITH COLORIMETRIC PARAMETERS

FIELD OF THE INVENTION

The present invention relates to adjusting the skin tone in a reproduction of an image, and more particularly, to a photographic color imaging system that selectively adjusts the skin tone of individuals in images in accordance with customer preferences.

BACKGROUND OF THE INVENTION

Color negative/positive photographic systems in use today are designed to produce pleasing prints for most of the people in a target population. The print appearance includes both pleasing tone and color reproduction to produce colorful prints with good contrast, and particularly excellent skin tone reproduction. Typically, existing photo systems are designed to be optimized for a particular skin type and preference, for example, Caucasian, Oriental, Asian, Indian, and/or Black. Photographic film, paper, and printer sets-ups are generally designed for providing pleasing color for a particular market segment. In taking photographs of an individual of a first skin tone type with a system designed for a second skin tone type, the skin tones of the first skin tone type will appear undesirable. For example, in a system designed for Caucasians, individuals having a darker skin tone will result in the darker skin tones appearing compressed. This often results in the facial features being lost in an overly dark representation.

It is possible to design a photographic system that is optimized for dark-tone skin tone reproduction. This can be done by adjusting the photographic film, paper, and/or printer set-ups. However, this kind of system would not produce optimum light-tone skin tone reproductions. Solving the problem in this manner would still result in the inability of a single system to produce pleasing skin tone reproduction, regardless of the lightness of the skin tones in the scene. Marketing two different films would increase marketing and inventory costs, and potentially lead to confusion in the customer's mind about the circumstances for use of the different systems.

With current photo systems, the only option available for improving the reproduction of skin tones, which the system is not designed for, is to adjust the print density and color balance during printing. Neither of these adjustments produces preferred prints because they alter the reproduction of portions of the scene that are not skin tones.

U.S. Pat. No. 5,300,974 to Stephenson discloses a system that allows the camera user to record the color balance preference.

U.S. Pat. No. 5,710,954 to Inoue discloses a system involving a video image in which the customer selects a preferred color balance.

U.S. Pat. No. 5,726,737 to Fredlund et al describes a system for controlling photofinishing of photosensitive material.

U.S. Pat. Nos. 5,488,429 and 5,638,136 to Kazuaki et al describes a method and apparatus that detects skin tones in an image.

Thus, there is a need to provide an economical photographic system that can be adjusted to compensate for different skin tones in accordance with customer preferences without concern as to the tone characteristics of the originating film or providing a plurality of different film types, each being directed to a different skin type. There is also a need to provide a system wherein the customer and/or photo lab can select manually or automatically the desired skin tone characteristics.

In a system made in accordance with the present invention, a solution is provided for eliminating and/or minimizing the problems of the prior art that can improve images provided on conventional photosensitive media, or in digital format. Print algorithms are provided in a digital photofinishing system, which changes the appearance of the skin tones in a print to a selected preference. The preference may be obtained by a selection option provided detected on the film processing order, encoded on the film itself, or carried out automatically by the photofinisher providing a specific skin tone preference is desired in a region of a country and/or world. The skin tone adjustment can be one of one or more selections available in the algorithm, or accessed from a customer profile.

SUMMARY OF THE INVENTION

The present invention is directed to overcoming one or more of the problems set forth above. Briefly summarized, according to one aspect of the resent invention, there is provided a method of modifying images, comprising the steps of:

a) analyzing a digital image file of an image so as to identify at least one predetermined calorimetric parameter; and b) modifying that portion of the image having the at least one predetermined calorimetric parameter to a second predetermined colormetric parameter so as to produce a modified digital image.

In accordance with another aspect of the present invention, there is provided an apparatus for modifying digital images, comprising:

a) an analyzer for analyzing a digital image file of an image so as to identify at least one predetermined colorimetric parameter; and b) means for automatically modifying that portion of the image having the at least one predetermined calorimetric parameter to a second predetermined colormetric parameter so as to produce a modified digital image.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE DRAWINGS

The present description will be directed in particular to elements forming part of, or in cooperation more directly with, the apparatus in accordance with the present invention. It is understood that elements not specifically shown or described may take various forms well known to those skilled in the art.

Figure 1:
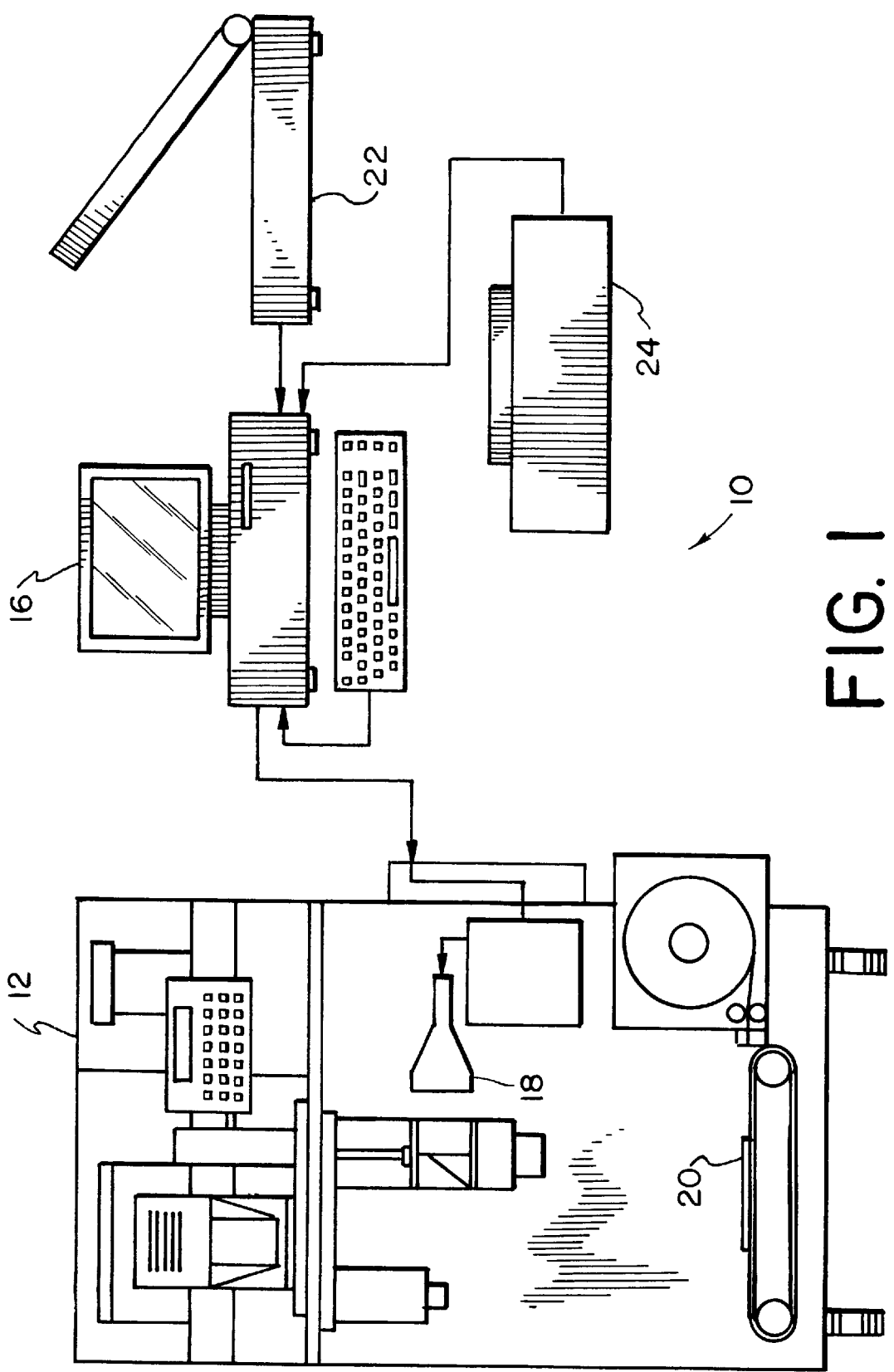
FIG. 1 is a schematic diagram of a photographic printing apparatus made in accordance with the present invention.

Referring to FIG. 1, there is illustrated a photographic printing system 10 made in accordance with the present invention. In the particular embodiment illustrated, system 10 includes a digital minilab printer 12. An example of such a suitable digital minilab is the Gretag Imaging Masterlab 740 Digital with Kodak Digital Printer. In particular, this digital minilab printer 12, which can make a print onto photographic paper from a digital record, uses a CRT printer. A CPU/computer 16 is provided for allowing entry of data to printer 12 and for controlling operation of the minilab printer 12. While the computer 16 is illustrated as a separate device from the minilab, it may be an integral part of the printer 12. The minilab printer 12, in the embodiment illustrated, is provided with a cathode ray tube 18 for exposing an image onto the photosensitive material 20, for example, photosensitive paper which is then in turn processed for development. It is, of course, understood that any other desired digital printing device may be utilized, including, for example, but not by way of limitation, LEDs, lasers, ink jet, thermal, electrophotographic, or other digital type printers. The system 10 further includes a digital scanner 22 for scanning images placed in the scanner and converting the information to a digital signal. An appropriate digital printer scanner 22 and film scanner 24 that can be utilized in the system 10 is exemplified by the Kodak Digital Science Scanner 3500 which scans photographic film, or the Hewlett Packard Scanjet IICX color scanner which scans prints. The digital image file can also come from a digital camera such as a KODAK DC 265 Digital Camera. In the embodiment illustrated, scanner 22 is designed to scan film negatives so as to obtain a digital record of the images on the negative film. After the digital record of the image has been obtained, the digital record is transferred to the printer by the appropriate software previously provided in the computer 16 such that a print image can be made by the printer 12.

A computer algorithm provided in computer 16 first identifies if skin tones are present in the image file obtained by scanner 22. This is accomplished by determining the colorimetric values of the image pixels scanned by scanner 22 using standard colorimetric techniques. Colorimetry is the measurement of color. A set of colorimetric parameters for an object, based on measured colorimetric parameters, can quantify the color of the object as it appears to the average observer under a specific set of viewing conditions. Techniques described in U.S. Pat. No. 5,528,339 can be used to identify the colorimetric values of the images suitable for use with the present invention, which are hereby incorporated by reference in their entirety. The algorithm is with a set of colorimetric parameters for various types of skin tone. Predetermined colorimetric values may be set for each of the desired skin types, for example, Caucasian, Oriental, Asian, Indian, and/or Black. This results in selectively identifying portions of the image obtained by the scanner 22. Having determined that a particular portion is of a particular flesh tone, the next step would be to modify the flesh tone to a particular hue and/or color. Preferably, the type and source of the image is entered into the computer 16, for example, the manufacturer of the photosensitive media that was scanned, the type of media scanned (if it is paper or film, etc.), and/or color characteristics of the media from which the images were obtained. The color characteristics may be preprogrammed into the algorithm for various known media of various media manufacturers. The so identified portions are then modified to preselected colorimetric values, the selection of which is determined by the preference of the photo lab or consumer. The selected preferences may be preprogrammed into the algorithm or entered by the photo- finishing lab operator or consumer. The algorithm modifies the digital file in accordance with the selected preference. The modified image is then sent to the printer for printing onto the photosensitive media. The algorithm may select the only available single alternative reproduction adjustment, such as a dark-toned skin tone adjustment. Or the algorithm may select among a set of available alternative reproduction adjustments, such as by race and lightness range, based on customer option or the identity or darkness of skin tones in the captured scene. The available adjustments may include a customer-specified custom option, created as a profile by the customer.

When the algorithm alters the default skin tone reproduction, the adjustment may consist of a print density or color balance bias, or more preferred, the application of a matrix or 3D table of parameters to the digital capture image. The 3D table of parameters is the preferred embodiment because it allows skin tones to be altered without altering the remaining colors in the image. It is also possible to alter the color reproduction of the skin tones within the scene by applying a matrix only if the pixel value is a skin tone.

The preferred adjustment will often consist of a reduction in skin tone colorfulness and a reduction in the contrast of the reproduction in color region of the skin tones. Generally, it is preferred to maintain a neutral gray scale in the image while adjusting the skin tones to their preferred colorimetric position. However, any adjustment preferred by the customer may be implemented.

Figure 2:
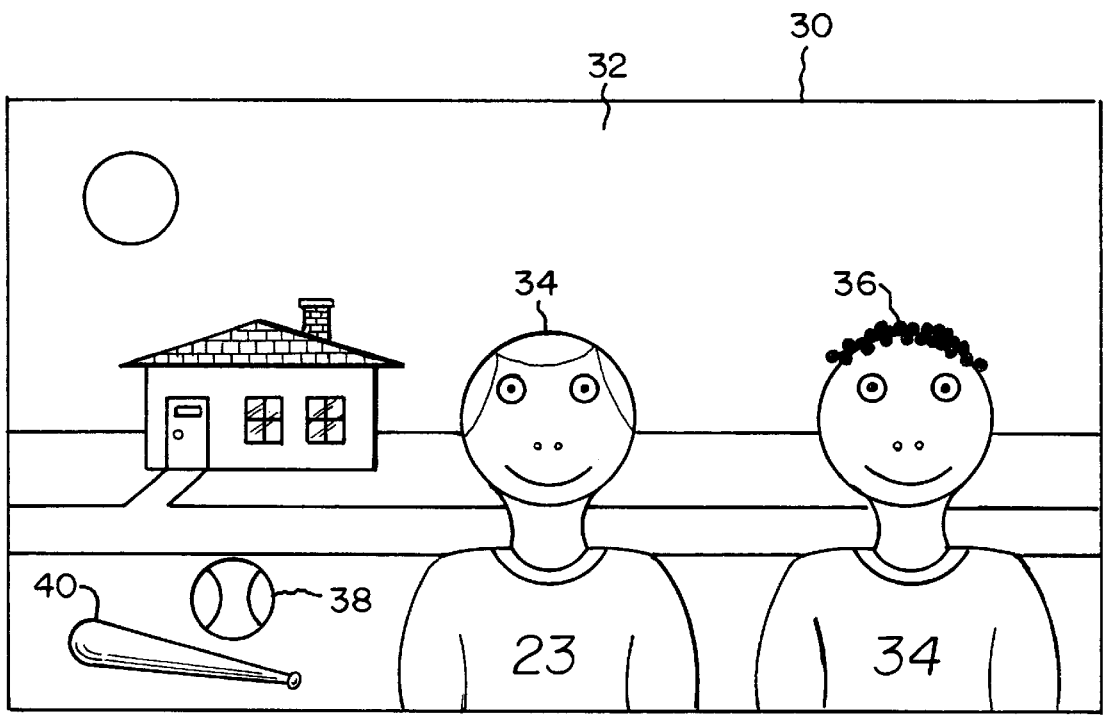
FIG. 2 illustrates a photograph that is to be reproduced by the apparatus of FIG. 1.

In order to better understand the present invention, a brief description of its operation will be discussed. Referring to FIG. 2, there is illustrated a portion of a negative film 30 having an image scene 32 printed thereon. In the particular embodiment illustrated, the scene 32 includes a variety of items and individuals. Scene 32 includes a first individual 34 of a first skin tone and a second individual 36 of a second type skin tone, a basketball 38, and a bat 40 shown against a blue sky 42 and green grass 44. In the embodiment illustrated, individual 34 has Caucasian skin tones and individual 36 has dark skin tones. The film 30 is placed in scanner and a digital record file of the image scene 32 is obtained and sent to computer 16. A colorimetric analysis of the image data is accomplished by the prestored algorithm in the computer and the flesh tones, as defined by predetermined colorimetric parameters, are identified. Once having identified portions of the image that are flesh tones, all such identified flesh tone areas of the scene image are modified in accordance with selected skin tone characteristics. For example, if the lab making the reproduction of the scene image is in a region where there are predominately dark skinned individuals, or the individual requesting the reproductions is dark skinned, the algorithm can be programmed to modify only the identified flesh tone areas in accordance with calorimetric parameters best suited to dark skinned flesh tones. The customer selection can be made by checking an appropriate box on the order form used for ordering of the prints, or the algorithm can be automatically activated by the algorithm that analyzes the image data from the scanner to recognize the skin tone of a particular ethnic group. It is, of course, understood that one, some and/or all various skin tone modifications may be applied to all the images.

The present invention provides prints that are pleasing to the customer regardless of the lightness of skin tones in the photographed scene. Given that generally the same photographic films and papers are distributed worldwide, a digital image processing algorithm is introduced in a digital photofinishing system to alter the appearances relative to a predetermined scene reproduction automatically or manually as desired by the photographic lab, or as selected by the consumer. The present invention avoids the need of providing separate film types throughout the world to accommodate local preferences. Additionally, the present invention modifies only the area containing flesh tones, thereby maintaining the overall color integrity of the remaining portion of the image. The present invention also provides the ability to change more than one different flesh tone in a scene to a preferred preference.

The invention has been described in detail with particular reference to certain preferred embodiments thereof, but it will be understood that variations and modifications can be effected within the scope of the invention.

PARTS LIST

10 Photographic printing system
12 Digital minilab printer
16 CPU/computer
18 Cathode ray tube
20 Photosensitive material
22 Digital scanner
24 Film scanner
30 Negative film
32 Image scene
34 First individual
36 Second individual
38 Basketball
40 Bat
42 Blue sky
44 Green grass

What is claimed is:

1. A method of modifying images, comprising the steps of:
    a) analyzing a digital image file of an image so as to identify at least one predetermined colorimetric parameter; and
    b) modifying that portion of said image having said at least one predetermined colorimetric parameter to a selected second predetermined colormetric parameter so as to produce a modified digital image.

2. A method according to claim 1 wherein said first predetermined calorimetric parameter comprises a skin tone of a particular type.

3. A method according to claim 1 wherein said predetermined calorimetric parameter is directed to light skinned individuals.

4. A method according to claim 1 wherein said predetermined calorimetric parameter is directed to dark skinned individuals.

5. A method according to claim 1 wherein said predetermined calorimetric parameter is determined automatically.

6. A method according to claim 1 wherein said digital image file is obtained from scanning an image.

7. A method according to claim 1 wherein said digital image file is obtained from a digital camera.

8. A method according to claim 1 wherein said predetermined colorimetric parameter is identified only within that portion of the image identified as containing facial features of people.

9. A method according to claim 1 further comprising the steps of printing, storing, or otherwise transferring said modified digital image file.

10. A method according to claim 9 wherein said modified digital image file is printed by a digital printer.

11. A method according to claim 9 wherein said modified digital image file is displayed via an electronic means.

12. A method according to claim 1 wherein two colorimetric parameters are identified in a single scene.

13. A method according to claim 12 wherein said two calorimetric parameters comprise a light skin tone and a dark skin tone.

14. An apparatus for modifying digital images, comprising:
    a) an analyzer for analyzing a digital image file of an image so as to identify at least one predetermined colorimetric parameter; and
    b) means for automatically modifying that portion of said image having said at least one predetermined colorimetric parameter to a selected second predetermined colormetric parameter so as to produce a modified digital image.

15. An apparatus for modifying digital images according to claim 1 wherein said at least one predetermined colorimetric parameter is skin tone.

16. An apparatus for modifying digital images according to claim 14 further comprising a printer for printing said image as modified.

17. An apparatus according to claim 16 wherein said printer is a digital printer for printing onto a photosensitive media.

18. An apparatus according to claim 17 wherein said photosensitive media is photographic paper.

19. An apparatus according to claim 14 further comprising a display device for displaying said digital image as modified.

* * * * *

UNITED STATES PATENT AND TRADEMARK OFFICE
CERTIFICATE OF CORRECTION

PATENT NO. : 6,396,599 B1
DATED : May 28, 2002
INVENTOR(S) : David L. Patton et al.

It is certified that error appears in the above-identified patent and that said Letters Patent is hereby corrected as shown below:

<u>Column 5,</u>
Lines 44, 47 and 50, delete "calorimetric" and insert -- colorimetric --

<u>Column 6,</u>
Lines 2 and 22, delete "calorimetric" and insert -- colorimetric --

Signed and Sealed this

Fifth Day of November, 2002

Attest:

JAMES E. ROGAN
Attesting Officer           Director of the United States Patent and Trademark Office